Dec. 12, 1933.  E. F. TILLEY  1,939,373

JOINT

Filed Sept. 4, 1930   2 Sheets-Sheet 1

E. F. Tilley INVENTOR

BY Thomas Howe ATTORNEY

Dec. 12, 1933.   E. F. TILLEY   1,939,373
JOINT
Filed Sept. 4, 1930   2 Sheets-Sheet 2
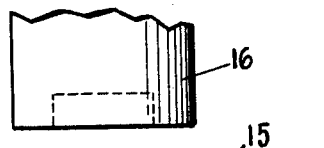
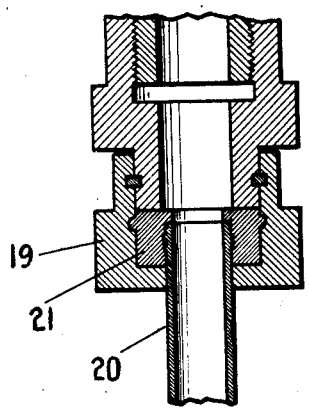
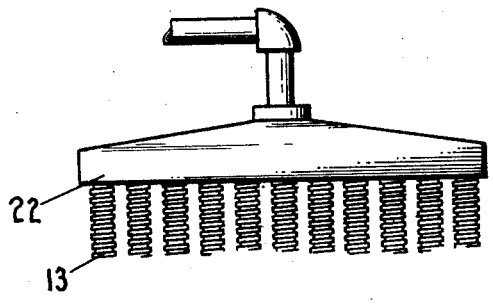
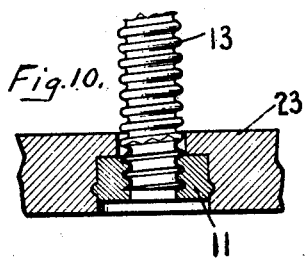
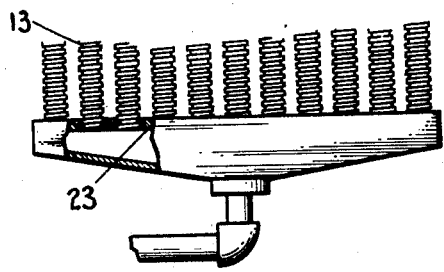
E. F. Tilley   INVENTOR
BY
Thomas Howe   ATTORNEY Patented Dec. 12, 1933

1,939,373

UNITED STATES PATENT OFFICE 1,939,373

JOINT

Edwin F. Tilley, Dunnellen, N. J., assignor to Titeflex Metal Hose Co., a corporation of New Jersey Application September 4, 1930. Serial No. 479,592

13 Claims. (Cl. 29—148.2)

The present invention relates to joints and a method of forming joints, between pipes or rods and plates or other bodies as may be desired.

One of the objects of the invention is to provide a new and improved method of forming a joint between a metallic pipe or rod and a metal plate or other metallic body resulting in a strong and permanent union.

Another object is to provide a new and improved joint.

The invention has special application to pipe joints which have hitherto been soldered or requiring that both the pipe and the body with which it makes union be threaded. The method of threading requires more time and is more expensive; while a soldered joint lacks strength and the degree of fluid-tightness cannot be controlled under all conditions of usage, pressure and temperature. Where fluid-tightness is a prerequisite, in addition to strength, the method of soldering is not efficient.

The main object of this invention is to provide a more simple joint between a metallic pipe or rod and another body which shall be efficient and inexpensive and may be quickly and accurately formed by machinery, by upsetting a metallic sleeve or washer, between the member to be joined and the body with which it is to make union.

A further object of this invention is to provide a joint where special tightness is required under conditions of heat by using an upsettable metal sleeve of greater coefficient of expansion than that of the pipe or rod and the body with which union is to be made.

Other and ancillary objects of the invention will appear hereinafter.

In the accompanying drawings which illustrate the invention:

Fig. 7 is a view in section of a pipe coupling showing the application of the improved joint thereto;

Fig. 8 is a view in section of apparatus including a die, sleeve, plate and rod in position to be acted upon by the die to secure the rod to the plate;

Fig. 9 is a front elevation of a radiator, partly broken away, showing the application of the invention to a radiator; and Fig. 10 is a fragmentary view, in section, on an enlarged scale of a joint of said radiator.

Figure 2:
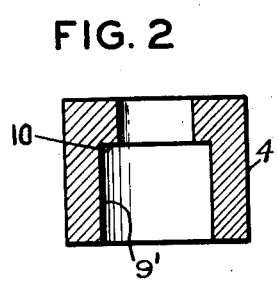
Fig. 2 is a section of the sleeve to be upset to form the joint.
Figure 1:
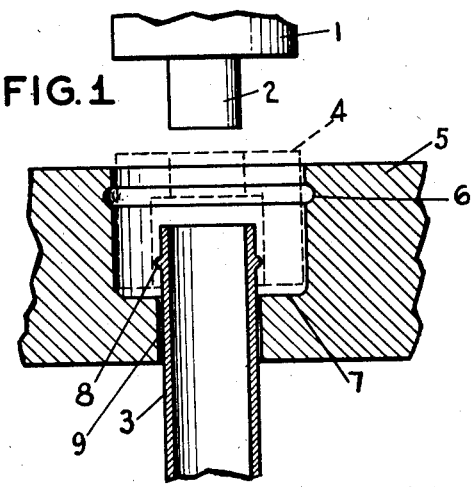
Fig. 1 is a front elevation of apparatus in position to be acted upon by the die, showing the die, pipe, sleeve and plate, before forming the joint.

Referring to the drawings, in Fig. 1, 1 is the die with part 2 which fits inside of the pipe 3. The top of the die at 1 engaging the top of the sleeve 4, shown in dotted lines. The plate 5 has an annular groove 6 and shoulder 7. A shoulder 8 may be put on the pipe. The diameter 9' of the sleeve 10, Fig. 2, corresponds to an easy fit on the pipe 3. The sleeve 11, Fig. 4, is threaded at 12 to fit the helical corrugations 13 of the pipe shown in Fig. 3.

In Fig. 8, 14 is a rod, 15 is the sleeve shown in dotted lines, which fits the rod and 16 is the die. The rod is shown knurled or undercut as indicated at 18. In Fig. 7, 19 is a part of a pipe union, 20 is the pipe and 21 is the sleeve after it has been pressed in shape forming the joint. In Fig. 9 is shown a radiator 22, with an enlarged view, broken away, showing the joint 11 between the pipe 13 and the header 23.

Figure 5:
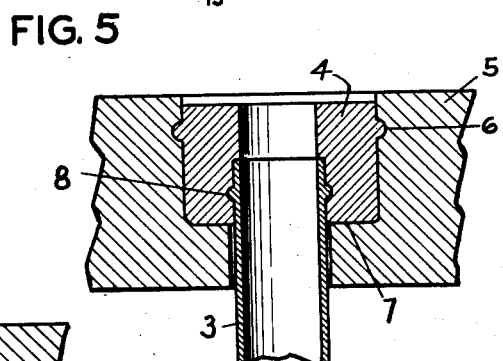
Fig. 5 is a view in section showing the pipe, sleeve and plate (see Fig. 1) after the joint has been formed.

Referring to Fig. 1, the pipe 3 is inserted in the hole 9 shown in plate 5, and both the plate and the pipe are held rigidly in place by any appropriate means. The sleeve 4, shown in dotted lines, is placed on the end of the pipe 3. The bottom of the die 1 has a part 2 which fits inside the pipe and prevents the walls of the pipe from being bent in during the operation of forming the joint. The top of this die has a shoulder which fits the top of the sleeve. The die may be operated by hydraulic, pneumatic or other appropriate power which can be accurately controlled as to pressure and reciprocating movement in the vertical plane. The die 1 is put in place, pressure applied and the sleeve 4 is pressed on to the pipe 3, the metal of the sleeve is upset, flowing in and around the pipe and the plate 5, forming a tight joint as shown in Fig. 5. The outside surface of the pipe where the joint is to be made may be knurled as at 8 or the surface roughened.

Figure 4:
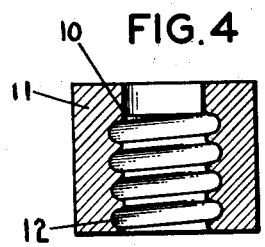
Fig. 4 is a view in section of the upsettable sleeve used for helically corrugated pipe.
Figure 3:
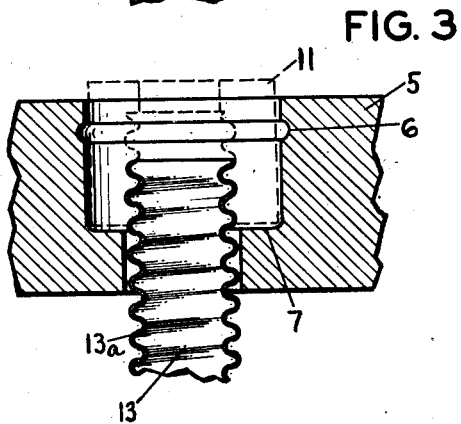
Fig. 3 is a view similar to Fig. 1 as applied to helically corrugated pipes.

A modification of this invention is shown in Fig. 3, which shows the application of this joint as applied in corrugated pipes, where the sleeve 11, Fig. 4, is threaded to fit the helical corrugation 13a of the pipe 13.

Where the joint is to be subjected to high temperatures the upset sleeve may advantageously be of a material of a higher coefficient of expansion than the material of the plate, and preferably also than the tube or rod, thus where the plate is iron or steel, the tube or rod may be of brass and the upset sleeve of lead. This higher coefficient of the lead will cause the space between the plate and tube or rod to be tightly filled at all times, even under wide variations in temperature, so that the joint is always tight.

Figure 6:
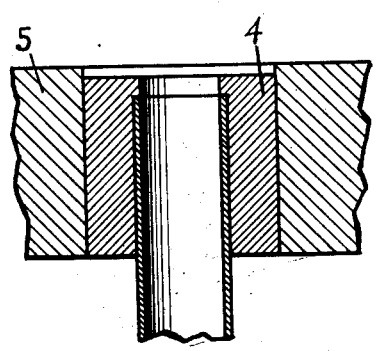
Fig. 6 is a view in section showing a modified form of joint.

Another modification of the invention is shown in Fig. 6, wherein the shoulder 7, annular recess 6, and shoulder 8 of Fig. 1 are omitted, but the surface of the pipe where the joint is to be formed is roughened to cause a better holding surface.

A still further modification of this invention is shown in Fig. 8, and shows its application to forming a joint between a rod 14 and the plate 17. The method of forming the joint in this case is the same as already described with the exception that a modified form of die as 16, is used. This die accurately fits the top of the sleeve 15, but has a hollow recess, as shown, of the same diameter as the rod. The annular recess 6, Fig. 1, is omitted, but may be used if desired.

While the invention has been illustrated in what are considered its best applications, it may have other embodiments without departing from its spirit and is not therefore limited to the structures shown in the drawings.

What I claim is:

1. In a pipe joint, the combination of an upset metal sleeve member having a shoulder with a pipe, of a metal body having a hole for receiving said sleeve and said pipe, said sleeve having a greater coefficient of expansion than the pipe or the body and being about said pipe and between said pipe and said body, for forming a tight union between said pipe and said body.

2. In a pipe joint, the combination of an upset metal sleeve member having a shoulder with a pipe, of a metal body having a hole and a shoulder for receiving said sleeve and said pipe, said sleeve having a greater coefficient of expansion than the pipe or the body and being about said pipe and between said pipe and said body, for forming a tight union between the said pipe and said body.

3. In a pipe joint, the combination of an upset metal sleeve member having a shoulder with a pipe, of a metal body having a hole, a shoulder and an annular recess for receiving said sleeve and said pipe, said sleeve having a greater coefficient of expansion than said pipe at said body, and being about said pipe and between said pipe and said body, for forming a tight union between the said pipe and said body.

4. In a pipe joint, the combination of an upset metal sleeve member having a shoulder with a corrugated pipe, of a metal body having a hole for receiving said sleeve and said pipe, said sleeve having a greater coefficient of expansion than the pipe or the body and being about said pipe and between said pipe and said body, for forming a tight union between the said pipe and said body.

5. In a pipe joint, the combination of an upset metal sleeve member having a shoulder with a corrugated pipe, of a metal body having a hole for receiving said member and said pipe, said member having a greater coefficient of expansion than the pipe or the body and being threaded over said pipe and being between said pipe and said body, for forming a tight union between the said pipe and the said body.

6. In a pipe joint, the combination of an upset metal sleeve member having a shoulder with a corrugated pipe, of a metal body having a hole, a shoulder and an annular recess for receiving said sleeve and said pipe, said sleeve having a greater coefficient of expansion than said pipe or said body, said sleeve being threaded over said pipe and between said pipe and said body for forming a tight union between the said pipe and said body.

7. The method of making a joint between a metal member having an upsettable metal sleeve thereon and a metallic body having a hole for receiving said member and said sleeve, consisting in locating said sleeve between said member and said body and up-setting said sleeve by pressure exerted upon the ends of said sleeve and upsetting said sleeve so located by pressure exerted upon its ends, the metal of said sleeve flowing around and between the said member and said body to form a tight union between the said member and the said body.

8. The method of making a joint between a metal member having an upsettable metal sleeve thereon and a metallic body having a hole, a shoulder and an annular recess for receiving said member and said sleeve, which consists in locating said sleeve between said member and body and upsetting said sleeve so located by pressure exerted upon its ends by means of a die and the said shoulder, so that the metal of said sleeve flows around and between the said member and said body to form a tight union.

9. The method of making a joint between a metal pipe having an upsettable metal sleeve thereon and a metallic body having a hole for receiving said pipe and said sleeve consisting in locating said sleeve between said pipe and body and upsetting said sleeve so located by pressure exerted upon its ends so that the metal of said sleeve flows around and between the said pipe and the said body to form a tight union between the said pipe and the said body.

10. The method of making a joint between a corrugated metal pipe having an unsettable metal sleeve threaded thereon and a metallic body having a hole and a shoulder for receiving said pipe and said sleeve, consisting in locating said sleeve between said corrugated pipe and said body and upsetting said sleeve so located by pressure exerted upon its ends so that the metal of said sleeve flows around and between the said pipe and said body, and into the corrugations of said pipe, to form a tight union between the said pipe and the said body.

11. The method of making a joint between a helically corrugated metal pipe and a metallic body which consists in inserting the pipe into an opening in said body, screwing an interiorly threaded sleeve of upsettable metal on to the corrugations of said pipe and upsetting the said sleeve by pressure exerted upon its ends whereby the metal of said sleeve flows to form a tight union between said pipe and said body.

12. The method of making a joint between a helically corrugated metal pipe and a metallic body which consists in inserting the pipe into an opening in said body, screwing an interiorly threaded sleeve of upsettable metal on to the corrugations of said pipe, said corrugated pipe extending but partially through said sleeve, and upsetting the said sleeve by pressure exerted upon its ends whereby the metal of said sleeve flows to form a tight union between said pipe and said body.

13. The method of making a joint between a metal pipe and a body which consists in inserting the said pipe within a hole in said body, locating an upsettable metallic sleeve between said pipe and said body and upsetting the said sleeve by pressure exerted upon its ends, meanwhile interiorly supporting the pipe, whereby the metal of the sleeve flows to form a tight union between said pipe and said body, and the pipe is prevented from collapsing during the upsetting operation.

EDWIN F. TILLEY.